(12) United States Patent  
Seeberg et al.

(10) Patent No.: US 9,250,149 B2  
(45) Date of Patent: Feb. 2, 2016

(54) RETRIEVABLE SENSOR AND METHOD

(71) Applicant: General Electric Company, Schenectady, NY (US)

(72) Inventors: Bjorn Erik Seeberg, Oslo (NO); Johan Petersson, Oslo (NO); Paal Martin Vagle, Asker (NO); Christopher Grinde, Baerum (NO)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 13/921,905

(22) Filed: Jun. 19, 2013

(65) Prior Publication Data

US 2014/0373635 A1    Dec. 25, 2014

(51) Int. Cl.  
*G01L 7/00* (2006.01)  
*G01L 19/00* (2006.01)  
*G01L 19/14* (2006.01)  
*G01L 19/08* (2006.01)

(52) U.S. Cl.  
CPC ............ *G01L 19/003* (2013.01); *G01L 19/0046* (2013.01); *G01L 19/086* (2013.01); *G01L 19/144* (2013.01); *Y10T 29/49815* (2015.01); *Y10T 29/49826* (2015.01)

(58) Field of Classification Search  
None  
See application file for complete search history.

(56) References Cited

U.S. PATENT DOCUMENTS

| | | | |
|---|---|---|---|
| 6,873,267 B1* | 3/2005 | Tubel et al. | 340/853.3 |
| 7,181,980 B2 | 2/2007 | Wium | |
| 2012/0055669 A1* | 3/2012 | Levin et al. | 166/250.17 |
| 2012/0247215 A1 | 10/2012 | Seeberg | |
| 2013/0047737 A1* | 2/2013 | Vagle et al. | 73/716 |

FOREIGN PATENT DOCUMENTS

| WO | 2011115502 | 9/2011 |
|---|---|---|
| WO | 2013036144 | 3/2013 |

OTHER PUBLICATIONS

Roxar Subsea ROV Retrieval System Data Sheet, Version A-230210, Roxar, Oct. 16, 2010.

* cited by examiner

*Primary Examiner* — Andre Allen  
(74) *Attorney, Agent, or Firm* — Armstrong Teasdale LLP

(57) ABSTRACT

Retrievable sensor devices and methods are provided that can be easily installed and removed from a sub-sea system without the need to stop the flow of working/process fluid. In particular, a retrievable sensor is provided that can be configured to be located remote from the process fluid to allow for easy access. In other embodiments, an actuator is provided that allows for pressure adjustments to be made during installation and/or removal of the sensor so as to avoid damage to the sensor and/or other system components and to avoid any process fluid/material leakage. Methods are also provided for installing/removing a retrievable sensor, as well as for adjusting a pressure of a retrievable sensor.

15 Claims, 7 Drawing Sheets

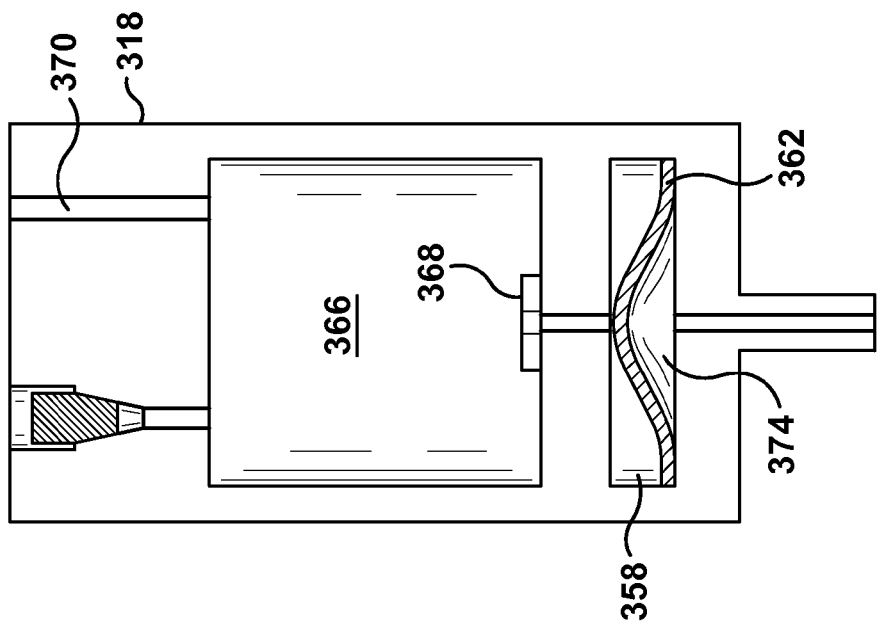
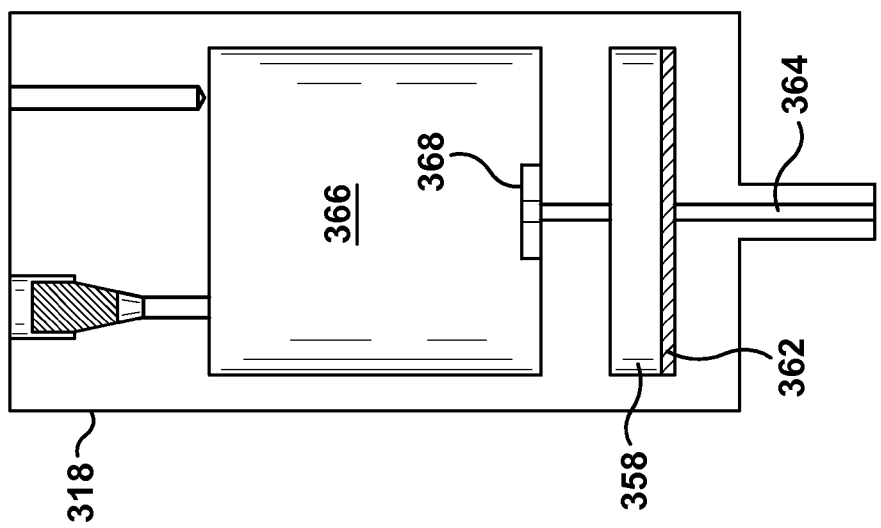
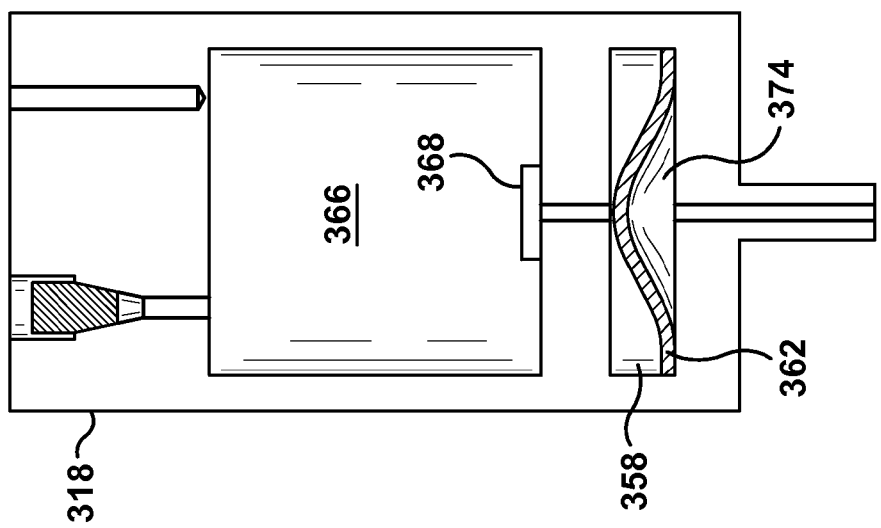

RETRIEVABLE SENSOR AND METHOD

TECHNICAL FIELD

A retrievable sensor and method for installing and replacing a retrievable sensor are provided.

BACKGROUND

Sub-sea oil and gas processing typically involves high-pressure, high-temperature, and high-volume and throughput processing equipment and systems. Ambient sea conditions can be harsh as they are generally high-pressure and remote from surface operations. Additionally, sub-sea processing systems often have hazardous process fluids and materials, such as petroleum sludge and sand, which results in a need for sub-sea processing systems that are substantially leak-free. Sub-sea processing components and systems can range in size from less than a meter to hundreds of meters. Due in part to the size of the systems and in part to the harsh ambient conditions faced by sub-sea systems, system components can often be difficult to access and retrieve.

Retrievable sensors, such as retrievable pressure and/or temperature sensors, are sensors which can be replaced while process fluids are present in the area in which a sensed condition is to be measured. In some processing systems, retrievable sensors are employed in a variety of configurations, which can include large clusters of components often referred to as sub-sea trees or "christmas" trees. The sensors are often disposed in a flange or bore in a pipe wall to allow for direct measurement of the process fluid. However, such sensors can be extremely difficult to access. To perform repairs or otherwise retrieve and/or replace components of retrievable sensors and other sub-sea systems, existing techniques often require pulling the whole construction to the surface of the water to be repaired on the deck of a ship. Such methods can be costly and require a lengthy stoppage in production while the construction is repaired on the surface. Additionally, known methods of retrieving sub-sea system components such as sensors can place the components at risk for rupture, for example due to the high pressures of process fluids and/or ambient conditions. Alternative and less costly methods can include the use of remotely-operated sub-sea vehicles.

Accordingly, there is a need for a sub-sea sensor assembly that allows for replacement in use without the requirement to open up the pipe wall or suspend the production/process. There is also a need for a sensor assembly that is readily accessible, easily removable, and substantially leak-free.

BRIEF DESCRIPTION

In general, a retrievable sensor device is provided that can be easily installed and removed from a sub-sea system without the need to stop the flow of working/process fluid. In particular, a retrievable sensor is provided that can be located remote from the process fluid to allow for easy access. An actuator is also provided that that allows for pressure adjustments during installation and/or removal of the sensor so as to avoid damage to the sensor and/or other system components and to avoid any process fluid/material leakage. Methods are also provided for installing/removing a retrievable sensor, as well as for adjusting a pressure of a retrievable sensor.

In one embodiment, a retrievable sensor device is provided and includes a sensing element having a sensor, a separation diaphragm, and a sensor cavity in fluid communication with the sensor and the separation diaphragm such that the sensor cavity is configured to transfer a sensed condition received by the diaphragm to the sensor for measurement. The device can also include an actuator in fluid communication with the sensor cavity. The actuator can be configured to adjust a volume of fluid in the sensor cavity and thereby alter a pressure of the sensor cavity.

In another embodiment, a method for installing a retrievable sensor is provided and includes inserting a sensing element into a housing to position a separation diaphragm on the sensing element in contact with a transfer diaphragm on a transferring element. The separation diaphragm can bound a sensor cavity in the sensing element. The method can include activating an actuator coupled to the sensing element to increase a pressure of the sensor cavity in the sensing element.

In other aspects, a method for retrieving a sensor is provided and includes at least partially withdrawing a sensing element from a housing to separate a separation diaphragm on the sensing element from a transfer diaphragm on a transferring element. The separation diaphragm can bound a sensor cavity in the sensing element. The method can also include activating an actuator coupled to the sensing element to adjust a pressure of the sensor cavity in the sensing element, and removing the sensing element from the housing.

BRIEF DESCRIPTION OF THE DRAWINGS

This disclosure will be more fully understood from the following detailed description taken in conjunction with the accompanying drawings, in which:

FIG. 7 is a cross-sectional schematic view of a two-chamber actuator shown during insertion of the sensor assembly;

FIG. 8 is a cross-sectional schematic view of a two-chamber actuator shown during operation of the sensor assembly;

FIG. 9 is a cross-sectional schematic view of a two-chamber actuator shown during retrieval of the sensor assembly;

Figure 1:
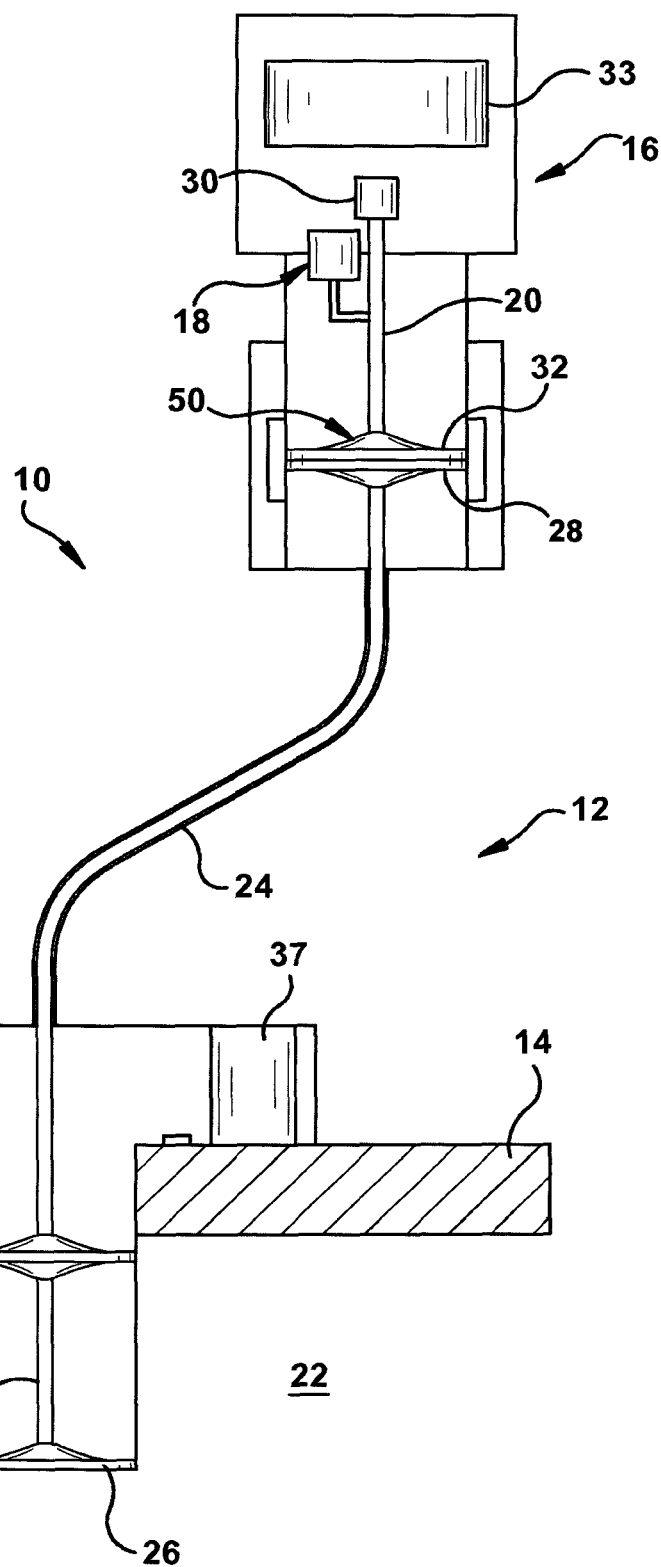
FIG. 1 is a cross-sectional schematic view of one embodiment of a retrievable sensing system.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein.

Retrievable sensing devices and methods are provided that can be easily installed and removed from a sub-sea system without the need to stop the flow of working/process fluid. In particular, a retrievable sensor is provided that can be configured to be located remote from the process fluid to allow for easy access. In other embodiments, an actuator is provided that allows for pressure adjustments to be made during installation and/or removal of the sensor so as to avoid damage to the sensor and/or other system components and to avoid any process fluid/material leakage. Methods are also provided for installing/removing a retrievable sensor, as well as for adjusting a pressure of a retrievable sensor.

FIG. 1 illustrates one embodiment of a retrievable sensing system 10 that generally includes a transfer element 12, shown disposed within an opening 13 in a sidewall of a pipe or chamber 14, and a sensing element 16 that is separate from but coupled to the transfer element 12. The transfer element 12 is configured to transfer a sensed condition, e.g., a pressure, of a process fluid 22 flowing through the pipe or chamber 14 to the sensing element 16, and the sensing element 16 is configured to transfer the sensed condition received from the transfer element 12 to a sensor 30 for measurement. In use, the transfer element 12 can be mated to a pipe or chamber 14 while the sensing element 16 is positioned at a remote location, e.g., on an external region of a sub-sea structure, that is more readily accessible for repair, installation, and/or removal. As further shown in FIG. 1, the sensing element 16 can also include an actuator 18 that is configured to modulate, i.e., selectively increase or decrease, a pressure of a sensor cavity 20 in the sensing element 16. The actuator 18 can thus facilitate insertion and/or removal of the sensing element 16 from the transfer element 12 without the need to stop flow production and while reducing any risk of damage to the transfer element 12.

Figure 2:
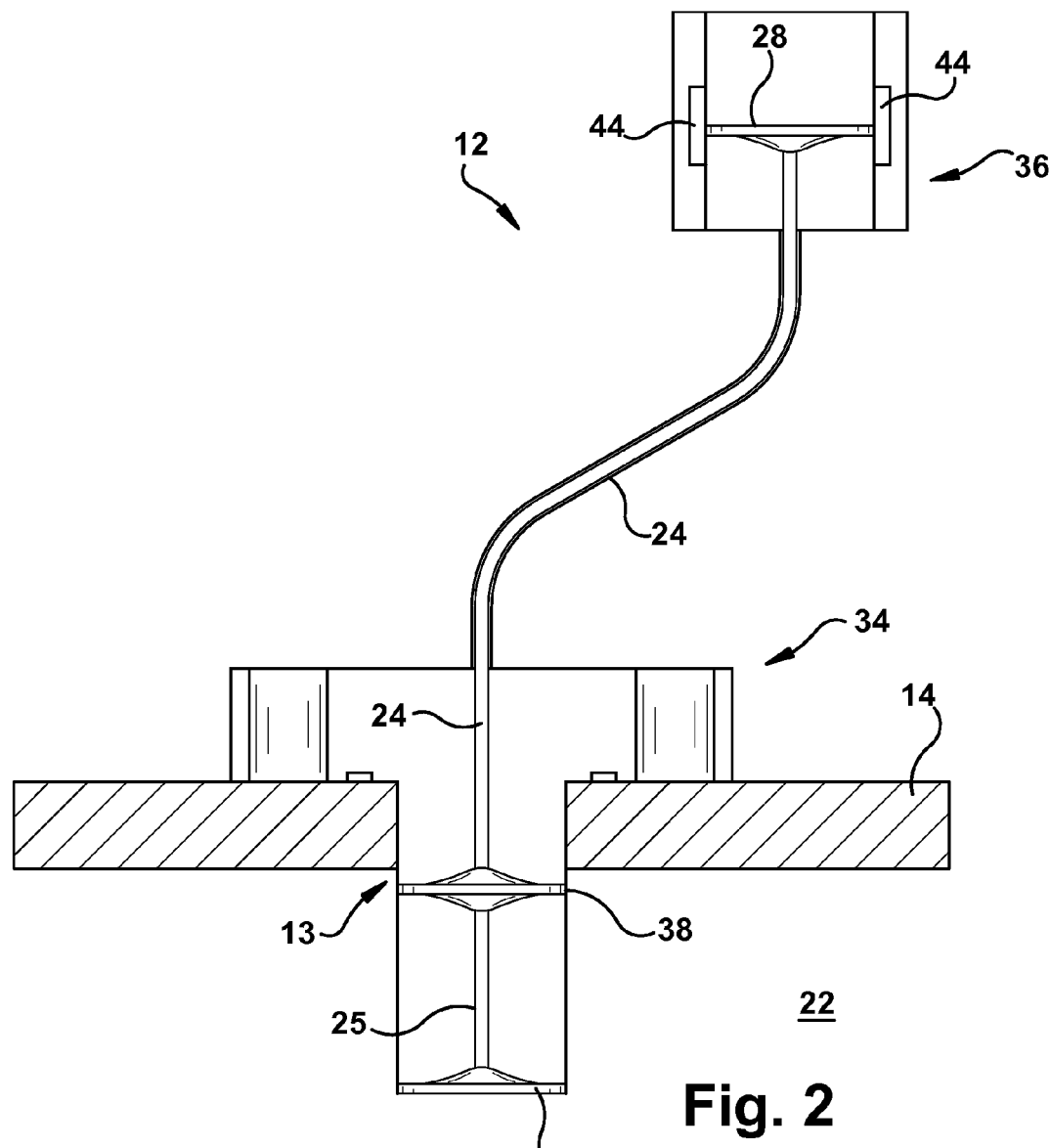
FIG. 2 is a cross-sectional schematic view of the transfer element of FIG. 1.

The transfer element 12 is shown in more detail in FIG. 2 and generally includes a distal portion 34 that is configured to couple to a pipe or chamber 14 having a process fluid 22 flowing therethrough, and a proximal portion 36 that is located remote from the distal portion 34 and that is configured to couple to the sensing element 16. The distal portion 34 can be in the form of a housing having a generally cylindrical portion that extends through an opening in a wall of a pipe or chamber 14, and having a flange formed around a proximal end thereof to allow for a removable or permanent coupling to the pipe or chamber 14. As shown in FIG. 2, the flange is permanently secured to the pipe or chamber 14 by welds 37, however other fastening elements, such as bolts, screws, adhesive, etc., can be used. As indicated above, the transfer element 12 is configured to transfer a pressure of the process fluid 22 in the pipe or chamber 14 to the sensing element 16. Accordingly, the distal portion 34 can include a first pressure transfer cavity 25 that is filled with a transfer fluid (i.e., hydraulic fluid) bounded on one end by a pressure receiving diaphragm 26 and bounded on the other end by a pair of safety diaphragms 38. A second pressure transfer cavity 24 that is filled with a transfer fluid can extend from the pair of safety diaphragms 38 to a pressure transfer diaphragm 28 located within the proximal portion 36 of the transfer element 12. A capillary tube or other lumen can define a portion of the second pressure transfer cavity 24 and it can extend between the distal and proximal portions 34, 36 of the transfer element 12. The capillary tube or lumen can have any length that is sufficient to allow the proximal portion 36 to be positioned at a desired distance from the distal portion 34 of the transfer element 12. In use, the pressure receiving diaphragm 26 is located within the lumen of the pipe or chamber 14 such that it is in direct communication with the process fluid 22. The diaphragms 26, 38, 28 and transfer fluid can thus respond to pressure changes in the process fluid 22. The safety diaphragms 38 can be provided so as to prevent leakage resulting from accidental damage to the pressure receiving diaphragm 26, however a person skilled in the art will appreciate that the safety diaphragms 38 need not be included and that the transfer element 12 can include a single pressure transfer cavity extending between the pressure receiving diaphragm 26 and the pressure transfer diaphragm 28.

The proximal portion 36 of the transfer element 12 can also be in the form of a housing and it can be configured to be removably or permanently disposed at a location that is remote from the distal portion 34 and that can be easily accessed. Such a configuration will allow for easy access to the sensing element 16 for installation and/or removal. While not shown, by way of example, the proximal portion 36 can be remotely mounted on a plate or panel around a perimeter of a sub-sea system. The proximal portion 36 can be configured to removably receive the sensing element 16, for example in a cylindrical cavity formed therein. Various mating techniques, such as threads, welds, etc., can be used to mate the sensing element 16 and the proximal portion 36 of the transfer element 12. Once mated, the sensing element 16 is preferably sealingly engaged with the transfer element 12 so as to prevent fluid from flowing there between. As shown in FIG. 2, an annular volume 44 can be formed in the proximal portion 36 of the transfer element 12 adjacent to the transfer diaphragm 28 so as to allow fluid between the transfer diaphragm 28 and a separation diaphragm 32 on the sensing element 16 to be removed or otherwise displaced.

Figure 3:
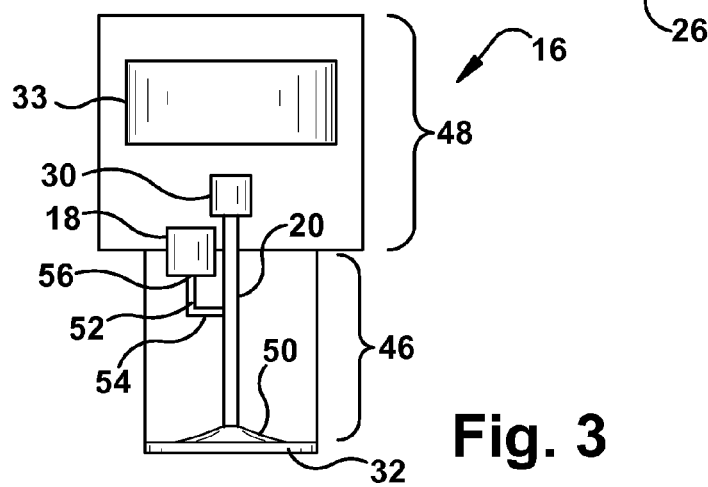
FIG. 3 is a cross-sectional schematic view of the retrievable sensing system of FIG. 1.

The sensing element 16 is shown in more detail in FIG. 3 and is generally in the form of a housing having a distal connection portion 46 and a proximal sensing portion 48. The distal connection portion 46 can be configured to mate with the proximal portion 36 of the transfer element 12. As shown in FIG. 1, the distal portion is generally cylindrical and is received within a generally cylindrical opening formed in the transfer element 12. As further shown in FIG. 2, the sensing element 16 generally includes a sensor cavity 20 extending from a separation diaphragm 32 and terminating at the sensor 30. The separation diaphragm 32 is positioned in the distal portion 46 and is disposed in a diaphragm seat 50 that is configured to make operative contact with the transfer diaphragm 28 of the transfer element 12. The sensor cavity 20 is filled with fluid and can be configured to transfer a pressure received by the separation diaphragm 32 to the sensor 30 for measurement, as discussed in detail below. As a result, movement of the separation diaphragm 32 in a proximal or distal direction causes an increase or decrease in fluid pressure within the sensor cavity 20. The sensor 30 can be configured to measure the pressure within the sensor cavity 20, which can correspond to the pressure of the process fluid 22 within the pipe or chamber 14 shown in FIGS. 1 and 2.

As was also indicated above, the sensing element 16 can include an actuator 18 that is in fluid communication with the sensor cavity 20, and that is configured to modulate, i.e., selectively increase or decrease, a pressure of fluid in the sensor cavity 20 to aid in insertion and/or removal of the sensing element 16 from the transfer element 12. Various configurations of actuators are discussed in detail with respect to FIGS. 4-9. As shown in FIGS. 1 and 3, the actuator 18 can be disposed within the housing of the sensing element 16, or in other embodiments it can be located in a separate housing attached to or remote from the sensing element 16. The actuator 18 can be fluidly connected to the sensor cavity 20 via a fluid lumen 52. The fluid lumen 52 includes a first end 54 that is fluidly connected to the sensor cavity 20 at any location between the sensor 30 and the separation diaphragm 32. A second end 56 of the fluid lumen 52 can be fluidly connected to the actuator 18, as shown in FIG. 3, such that the actuator 18 can modulate the volume within the sensor cavity 20 thereby altering a pressure of the fluid in the sensor cavity 20. A person skilled in the art will appreciate that the actuator 18 can be in fluid communication with the sensor cavity 20 using various lumen arrangements. A person skilled in the art will appreciate that all fluid filled cavities and/or holes in the diaphragm seats, such as diaphragm seat 50, in the sensing system 10 can be dimensioned so as to prevent breakage or blow-out of the bounding diaphragms due to pressure. For example, the diameter of the hole in diaphragm seat 50 can be about 0.3 mm.

Referring back to FIG. 1, the components of the sensing element 16, in particular the actuator 18 and the sensor 30, can be controlled by electronics disposed in an electronics housing 33. The electronics housing 33 can be configured to communicate wirelessly or otherwise allow for remote communication with users and/or other sub-sea system components and controllers.

In use, the transfer element 12 can be coupled to a pipe or chamber 14 in a sub-sea system and the sensing element 16 can be coupled to a region of the sub-sea system that is more accessible, e.g., around a perimeter of the sub-sea system. The sensing element 16 can be operably coupled to the transfer element 12 to allow a sensed condition, such as pressure, of a process fluid flowing through the pipe or chamber to be transferred to the sensing element 16. To the extent the sensing element 16 needs to be replaced, the sensing element 16 can be retrieved (i.e., removed) from the transfer element 12 and replaced once repaired or with a new sensing element. During such installation and removal, the transfer element 12 can remain in contact with the process fluid 22 in the pipe or chamber 14. To facilitate removal of the sensing element 16, the actuator 18 can be utilized to alter the pressure of the sensor cavity 20 so as to avoid damage to the diaphragms, as will be discussed in detail below. In some embodiments the actuator can be configured for use in calibrating the sensor assembly.

Figure 4:
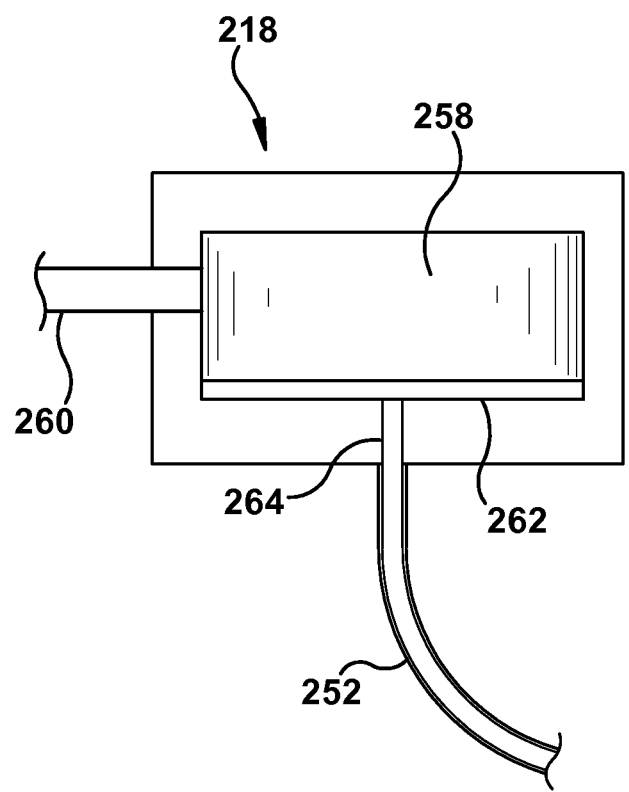
FIG. 4 is a cross-sectional schematic view of an embodiment of a single-chamber actuator.

One configuration of an actuator for use with the sensing system 10 of FIG. 1 shown in FIG. 4. The actuator 218 includes a pressurized chamber 258, a pressure adjusting port 260, and an actuator diaphragm 262 disposed over a fluid lumen port 264 having a fluid lumen 252 extending therefrom that is configured to communicate with the sensor cavity 20 in the sensing element 16. The chamber 258 is sealed by the pressure adjusting port 260 and the actuator diaphragm 262, and it can be pressurized by drawing a vacuum or otherwise filling the chamber with a pressurized gas. When the pressure within the chamber 258 is greater than the pressure within the sensor cavity 20, the actuator diaphragm 262 is forced to a flattened position that maintains the pressure in the fluid lumen 252 and the sensor cavity 20. When the pressure in the chamber 258 is less than the pressure in the sensor cavity 20, the actuator diaphragm 262 will be drawn or pushed toward the chamber 258 and thus the pressure in the sensor cavity 20 will be decreased. The pressure within the chamber 258 can be regulated by opening or closing the pressure adjusting port 260 or otherwise venting the chamber 258. As described above, the actuator 218 can be controlled by electronics disposed within an electronics housing 33 in the sensing element 16.

Figure 5:
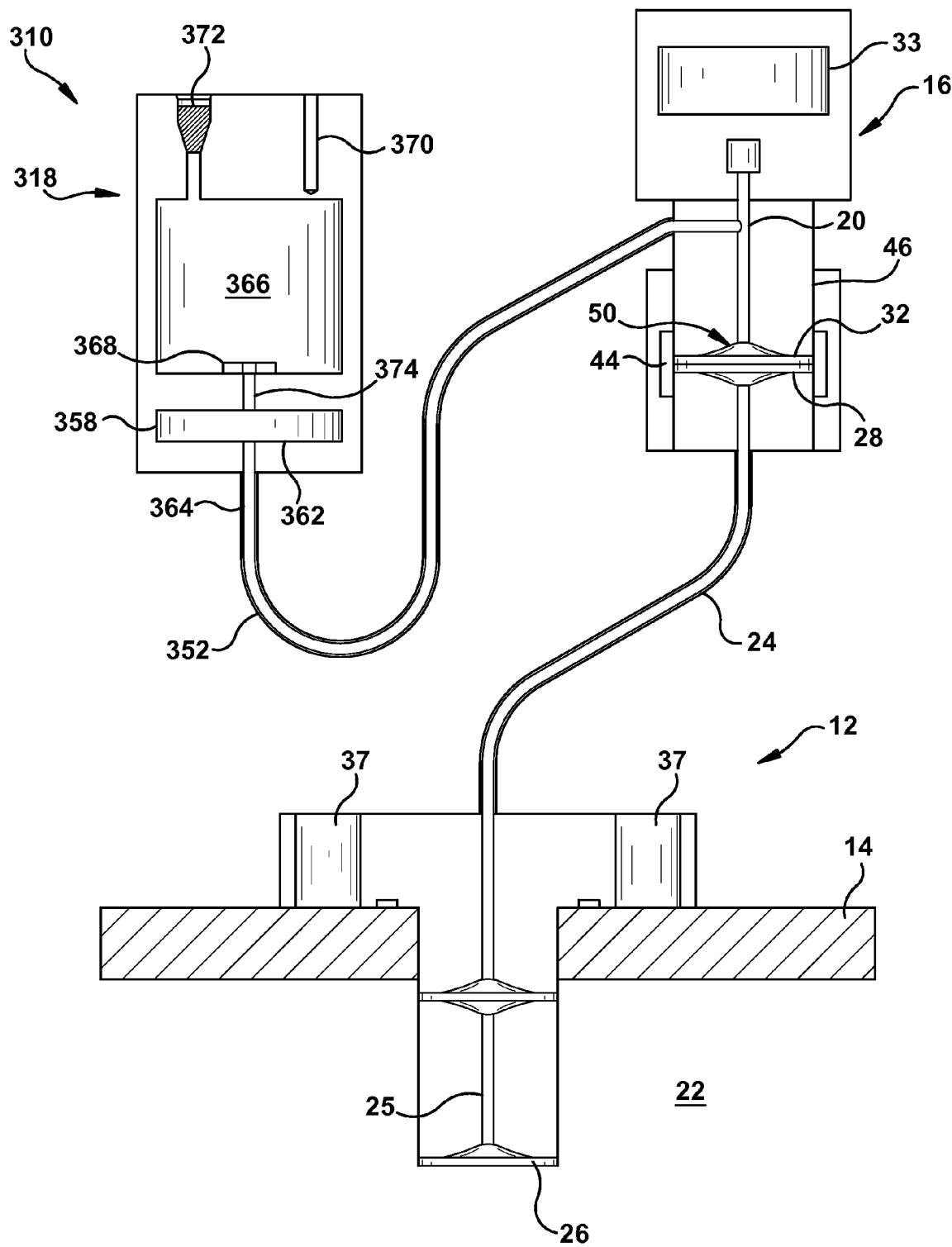
FIG. 5 is a cross-sectional schematic view of an embodiment of a retrievable sensing system having a two-chamber actuator.

FIG. 5 illustrates another embodiment of an actuator 318 having a negative pressure chamber 358, a pressurized chamber 366, a valve 368 coupled between the pressurized chamber 366 and the negative pressure chamber 358, and a release mechanism 370. The actuator 318 is shown coupled to the sensing element 16 of FIG. 1, which in turn is coupled to the transfer element 12 of FIG. 1. As shown, a fluid lumen port 364 can extend from an end of the negative pressure chamber 358 and it can be configured to be in fluid communication with the sensor cavity 20 in the sensing element 16. The negative pressure chamber 358 can be configured to hold a negative pressure (i.e., a pressure that is lower than the surrounding ambient sub-sea pressure, the pressure in the sensor cavity 20, and/or the pressure in the pressurized chamber 366). For example, the negative pressure chamber 358 can be configured to be under negative pressure by applying a vacuum on the chamber 358 during manufacturing of the actuator 318 and sealably forming the chamber so that the desired pressurization properties are maintained in a sub-sea environment. The pressurized chamber 366 can be configured to contain a pressurized gas to be released into the negative pressure chamber 358 at a desired time. As shown in FIG. 5, the pressurized chamber 366 can include a fill-port 372 and it can be coupled to the negative pressure chamber 358 by a lumen 374. A sealed valve 368 can seal the pressurized chamber 366 from the lumen 374 and the negative pressure chamber 358. The pressurized chamber 366 can be placed under pressure in preparation for placing the actuator 318 in sub-sea conditions, for example, by adding pressurized gas into the chamber 366 through the fill-port 372 in a manufacturing facility, although any method of pressurizing the chamber 366 as known in the art is sufficient. The fill-port 372 can be sealed, such as by welding, so that the pressure of the chamber 366 is maintained for long periods of time prior to installation in a sub-sea environment. Mechanical valves can also be used with the present teachings.

As noted above, the valve 368 can form a hermetic seal between the pressurized chamber 366 and the negative pressure chamber 358. In one embodiment, the valve 368 can be a one-time use valve that is actuated (e.g., punctured) to allow the gas from the pressurized chamber 366 to enter the negative pressure chamber 358 and then the valve can remain in an open position to allow for the flow of gas/fluid between the pressurized chamber 366 and the negative pressure chamber 358. For example, the valve 368 can be formed from a low-temperature melting alloy that is melted at a desired time to open the lumen 374. Alternatively, a movable valve, such as a ball-valve or butterfly valve can be used. In one embodiment, the valve 368 can be a pyrotechnic valve, as is known in the art. The valve 368 can be actuated/controlled remotely, such as by an underwater submersible vehicle, wired connection to the surface, or other radio/remote connection.

The release mechanism 370, as shown in FIG. 5, can be configured to release the pressure within the pressurized chamber 366, such as by venting the chamber 366 to the ambient sub-sea environment. The release mechanism 370 can be configured to pierce the pressurized chamber 366. In one embodiment, the release mechanism 370 is a drill. Alternatively, the release mechanism 370 can be a valve or any other mechanism known in the art for releasing pressure within a chamber.

The actuator 318 can be operatively coupled to the sensor cavity 20 in any manner known in the art to allow pressure transfer between the actuator 318 and the sensor cavity 20. For example, the negative pressure chamber 358 can include an actuator diaphragm 362 that can be disposed so as to bound the negative pressure chamber 358 or otherwise be operatively disposed within the negative pressure chamber 358 over the fluid lumen port 364 such that the diaphragm 362 responds to pressure changes in both the fluid lumen 352 and the negative pressure chamber 358. This diaphragm 362 can be sealably disposed in the negative pressure chamber 358 so that pressure transfer fluid does not exit the actuator 318 and/or fluid lumen 352 and further so that gas/fluid disposed in the negative pressure chamber 358 does not enter the fluid lumen 352. Additionally, the actuator 318 can be controlled by electronics housed within an electronics housing 33.

The components of actuator 318, such as the negative pressure chamber 358 and the pressurized chamber 366, can be formed from any material suitable for negative pressure environments and high pressure environments, as well as highly corrosive environments such as those known to exist in deep sea oil and gas operations.

Figure 6:
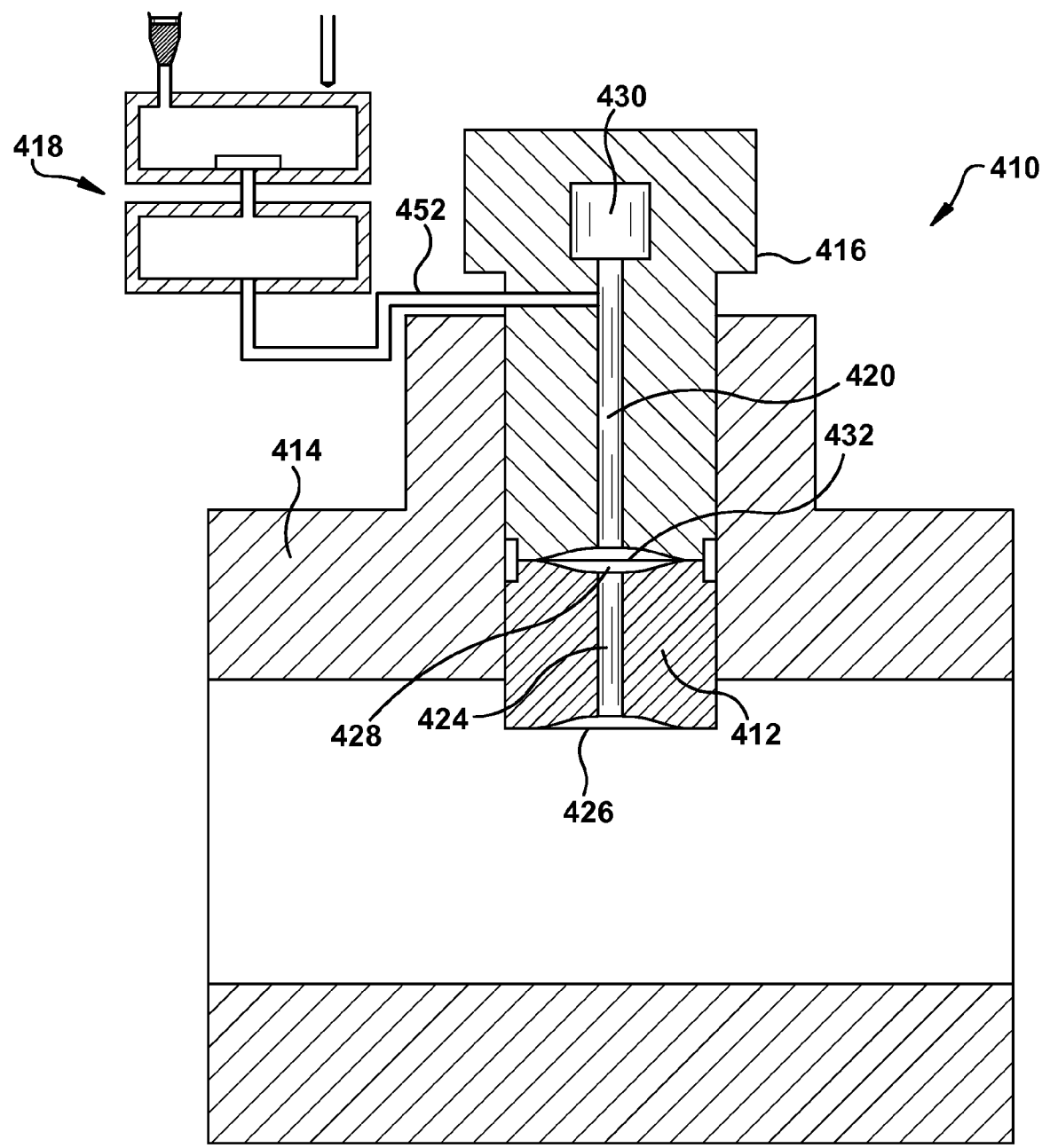
FIG. 6 is a cross-sectional schematic view of an embodiment of a non-remote retrievable sensing system.

FIG. 6 illustrates another embodiment of the retrievable sensing system 410 wherein the sensing element 416 coupled directly to the pipe or chamber 414, rather than being located at a remote location. The transfer element 412 can simply include a pressure pad having a process fluid diaphragm 426, a transfer cavity 424 filled with a transfer fluid, and a transfer diaphragm 428. The sensing element 416 can include a sensor cavity 420 that is bounded by a separation diaphragm 432 on one end and by the sensor 430 on the other. As is shown, the sensor cavity 420 can be fluidly connected to the actuator 418 via a fluid lumen 452 such that the actuator 418 can modulate the pressure within the sensor cavity 420. While not shown, the actuator 418 can be located within the sensing element 416, rather than remote from the sensor element as shown. Moreover, in all prior embodiments, the sensing element need not be remote and can be disposed within the sidewall of the pipe or chamber 414 as shown in FIG. 6. The actuator 418 can have the same configuration as the actuator 318 shown in FIG. 5, or the actuator 218 shown in FIG. 4 can be used. Although shown as being disposed outside of the sensing element 416 and fluid lumen 452, it is appreciated that the actuator 418 and fluid lumen 452 can be disposed within the sensing element 416.

In use, the actuators disclosed herein can be configured to aid in both insertion and removal of the sensor assembly. The actuator can be configured to allow fluid from the sensor cavity to be disposed in and/or flow into the fluid lumen during insertion and removal of the sensor. Alternatively, during normal operation of the sensor in sub-sea conditions, the actuator can be configured to maintain sufficient pressure on the sensor cavity to ensure operable contact between the separation diaphragm and the transfer diaphragm, as is shown in FIG. 1, such as by forcing transfer fluid into the sensor cavity from the fluid lumen.

FIGS. 7-9 illustrate use of the actuator 318 of FIG. 5. Turning first to FIG. 7, the actuator 318 is shown in a configuration that facilitates installation of the sensor assembly. As can be seen, the negative pressure chamber 358 is separated from the pressurized chamber 366 by the valve 368, which has not yet been actuated. Thus, as shown, the negative pressure chamber 358 is under a negative pressure which draws the actuator diaphragm 362 into the negative pressure chamber 358. By drawing the actuator diaphragm 362 into the negative pressure chamber 358, transfer fluid from the sensor cavity 20 is pulled into the fluid lumen 352 and/or the negative pressure chamber 358. As a result, the separation diaphragm 32 can be pulled into the diaphragm seat 50 in the distal connection portion 46 of the sensing element 16 so as to protect the diaphragm 32 from rupturing.

Once installation is complete, the negative pressure can be released to allow free movement of the sensor diaphragm. In particular, FIG. 8 illustrates the actuator 318 during normal operation of the sensor assembly. As shown, the valve 368 separating the pressurized chamber 366 and the negative pressure chamber 358 is in an open position, thus allowing gas/fluid (and therefore pressure) to transfer freely between the chambers 366, 358. The gas initially filling the pressurized chamber 366 now occupies the volume of both the pressurized chamber 366 and the negative pressure chamber 358. The pressure in the new combined volume allows the actuator diaphragm 362 to move toward and against the fluid lumen port 364. That is, the pressure on the actuator side of the diaphragm 362 is greater than the pressure on the fluid lumen side of the actuator diaphragm 362 (i.e., the pressure of the process fluid 22 in the pipe or chamber 14). This ensures that the pressure in the sensor cavity 20 is sufficiently high to ensure operable contact between the separation diaphragm 32 and the transfer diaphragm 28.

To remove the sensing element 16 from the transfer element 12, the actuator diaphragm 362 can again be drawn into the negative pressure cavity 358. To achieve this, the pressure from the negative pressure cavity 358 can be vented or released. In the configuration shown in FIG. 9, the valve 368 has been actuated allowing the free flow of gas/fluid between the negative pressure chamber 358 and the pressurized chamber 366. The vent hole may alternatively be formed directly in the chamber 358. In some embodiments, the chamber 358 may be vented directly by forming a vent in a wall of the chamber 358. As shown, the pressurized chamber 366 can be vented by piercing the chamber 366 with the release mechanism 370. This releases the pressurized gas from the pressurized chamber 366 and the negative pressure chamber 358 into the ambient sub-sea environment. This exposes the actuator diaphragm 362 to an actuator-side pressure that is substantially similar to that of the ambient sub-sea environment. Because the pressure of the operating fluid flowing through the pipe is generally greater than the sub-sea pressure, the transfer fluid will enter the fluid lumen and push the actuator diaphragm 362 into the negative pressure chamber 358, as shown in FIG. 9. With the actuator diaphragm 362 pushed into the chamber 358, the pressure in the sensor cavity is decreased, which allows the separation diaphragm 32 to push into the diaphragm seat 350 in the distal portion of the removable sensing element 16. In this configuration, the separation diaphragm 32 and the transfer diaphragm 28 are separable without risk of destruction of the diaphragm 28. This allows replacement of the sensing element 16 from the transfer element 12. Additionally, once in this configuration, sea-water can be allowed to fill the annular volume 44 surrounding the transfer and separation diaphragms to aid in separation.

Figure 10:
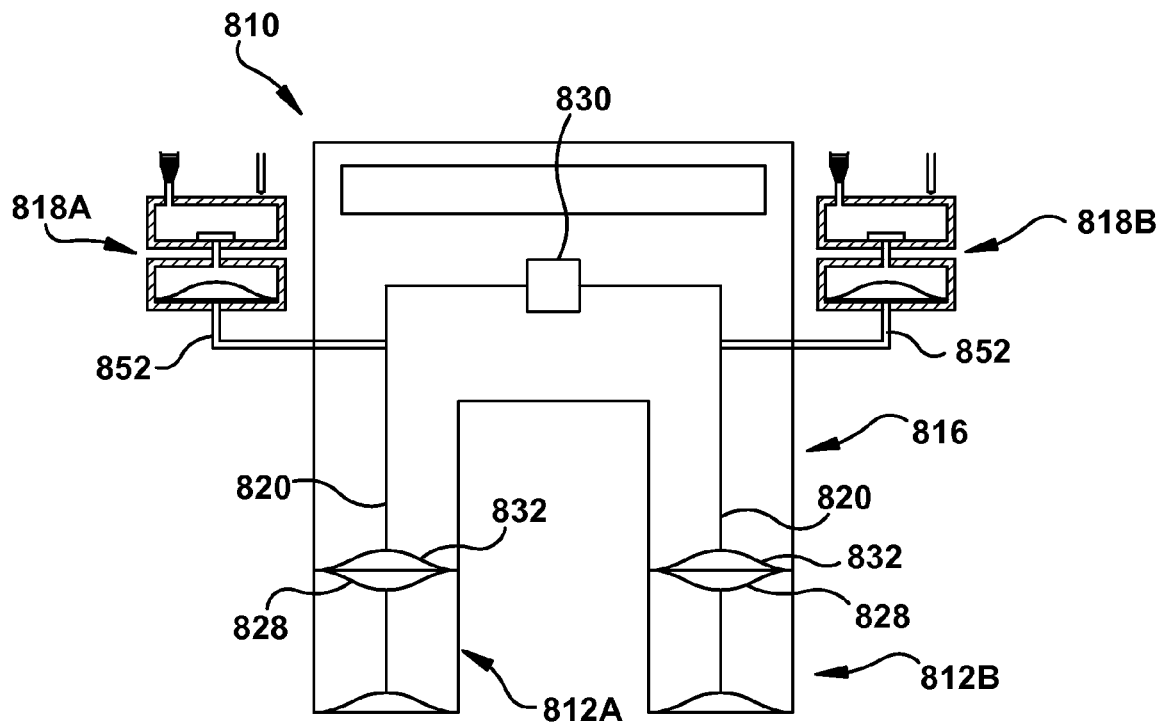
FIG. 10 is a cross-sectional schematic view of an embodiment of a retrievable sensing system having multiple actuators in a differential pressure measurement application.
Figure 11:
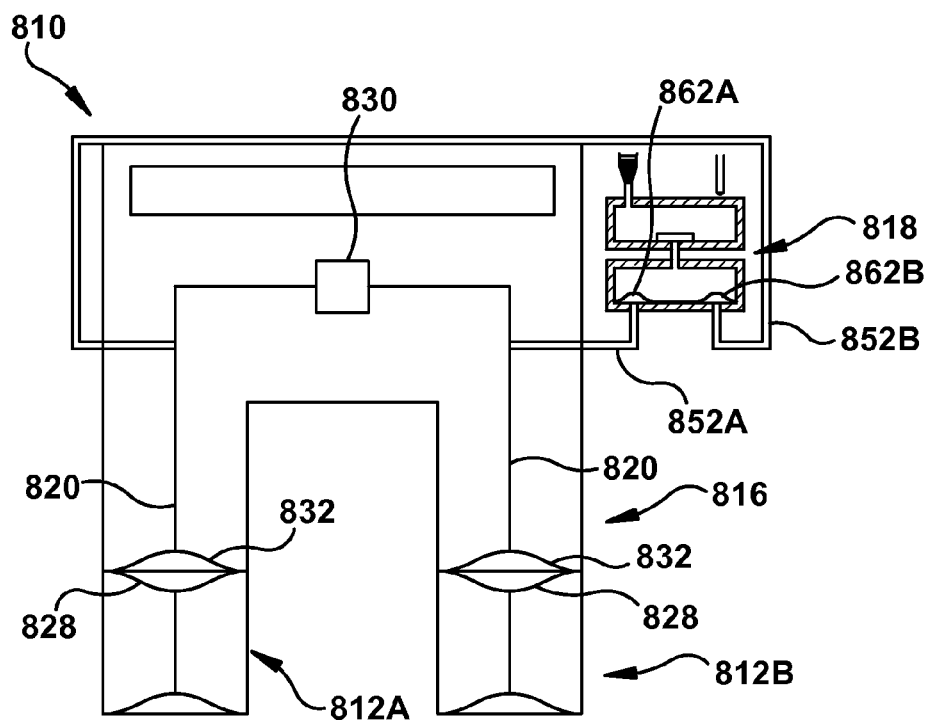
FIG. 11 is a cross-sectional schematic view of an embodiment of a retrievable sensing system having a single actuator in a differential pressure measurement application.

FIGS. 10 and 11 illustrate an embodiment of the retrievable sensing system 810 configured for differential pressure measurement. The retrievable sensing system 810 can include a plurality of transfer elements 812A, 812B such that the retrievable sensing system 810 can measure a pressure differential at different locations in or around a pipe or chamber, for example between a high pressure side and a low pressure side. The retrievable sensing system 810 can also include at least one sensing element 816 and at least one actuator 818. The at least one sensing element 816 can include at least one sensor 830 that is configured to measure, for example, a pressure differential, and at least one separation diaphragm 832 that can be configured to make operable contact with at least one transfer diaphragm 828 disposed on the transfer element 812A, 812B. The at least one actuator 818 can be fluidly connected to at least one sensor cavity 820 filled with transfer fluid. The actuator 818 can be any actuator described herein and can be fluidly connected to the sensor cavity 820 via a fluid lumen 852. Although shown as being disposed outside of sensing element 816, the actuator 818 can be disposed in the sensing element 816 or otherwise integrally formed therewith. As shown in FIG. 10, the system 810 can include two actuators 818A and 818B. Alternatively, as shown in FIG. 11, the system 810 can include a single actuator 818 that is configured to fluidly couple more than one fluid lumen 852A, 852B. In the embodiment shown in FIG. 11, the actuator can have more than one actuator diaphragm 862A, 862B, but can optionally have only one of any other actuator component described herein. The retrievable sensing system 810 can include any number of actuators 818, sensing elements 816, transfer elements 812, sensor cavities 820, and/or any other component necessary to perform differential pressure measurements that are configured to be coupled and decoupled at the same time. In use, the retrievable sensing system 810 can be configured such that the at least one sensor 830 can detect the pressure in different locations in or around a chamber and/or cavity (such as by monitoring the pressure within the at least one transfer elements 812A, 812B disposed in a chamber and/or cavity). The retrievable sensing system 810 can be configured to monitor the ambient sub-sea pressure as well as a pressure within a chamber and/or cavity. The sensor 830 can be configured to compare the pressures detected at the different locations to determine a differential pressure measurement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A retrievable sensor device, comprising:
a sensing element having a sensor, a separation diaphragm, and a sensor cavity in fluid communication with the sensor and the separation diaphragm such that the sensor cavity is configured to transfer a sensed condition received by the separation diaphragm to the sensor for measurement; and
an actuator in fluid communication with the sensor cavity, the actuator being configured to adjust a volume of fluid in the sensor cavity and thereby alter a pressure of the sensor cavity, wherein the actuator includes a first negative chamber and a second pressurized chamber separated from the first negative chamber.

2. The device of claim 1, wherein the sensor is at least one of a pressure sensor and a temperature sensor.

3. The device of claim 1, wherein the actuator includes an actuator diaphragm responsive to a pressure of the sensor cavity.

4. The device of claim 1, wherein the actuator is in fluid communication with the sensor cavity by a fluid lumen extending therebetween.

5. The device of claim 4, wherein the fluid lumen has a first end bounded by an actuator diaphragm disposed within the actuator, and second end that is in fluid communication with the sensor cavity.

6. The device of claim 1, wherein the actuator further includes a sealed valve hermetically separating the first and second chambers.

7. The device of claim 6, wherein the sealed valve is configured to be opened to release pressure from the second pressurized chamber into the first negative-pressure chamber.

8. The device of claim 6, wherein the sealed valve comprises a one-time valve that is configured to be punctured to release pressure from the second pressurized chamber into the first negative-pressure chamber.

9. The device of claim 6, wherein the actuator includes an actuator diaphragm bounding the second pressurized chamber, the actuator diaphragm being responsive to a pressure of the sensor cavity.

10. The device of claim 9, further comprising a fluid lumen having a first end bounded by the actuator diaphragm and second end in fluid communication with the sensor cavity.

11. A method for installing a retrievable sensor, comprising:
inserting a sensing element into a housing to position a separation diaphragm on the sensing element in contact with a transfer diaphragm on a transferring element, the separation diaphragm bounding a sensor cavity in the sensing element; and
activating an actuator coupled to the sensing element to increase a pressure of the sensor cavity in the sensing element, wherein the actuator has a first chamber that applies a negative pressure to the sensor cavity during insertion of the sensing element into the housing.

12. method of claim 11, wherein activating the actuator comprises opening a valve disposed between the first chamber and a second pressurized chamber to allow a pressure of the first chamber to be increased.

13. A method for retrieving a sensor, comprising:
partially withdrawing a sensing element from a housing to separate a separation diaphragm on the sensing element from a transfer diaphragm on a transferring element, the separation diaphragm bounding a sensor cavity filled with fluid in the sensing element;
activating an actuator coupled to the sensing element to adjust a pressure of the sensor cavity in the sensing element; and
removing the sensing element from the housing.

14. The method of claim 13, wherein the pressure of the fluid in the sensor cavity is decreased to a pressure that is less than a pressure of a fluid in a transfer cavity in the transferring element, the transfer cavity being bounded by the transfer diaphragm.

15. The method of claim 13, wherein activating the actuator comprises puncturing the actuator to release pressure from the sensor cavity.

* * * * *